(12) United States Patent
Hirai et al.

(10) Patent No.: US 6,814,685 B2
(45) Date of Patent: Nov. 9, 2004

(54) ROLLING ELEMENT FOR A CONTINUOUSLY VARIABLE TRANSMISSION (CVT), A CVT USING THE ROLLING ELEMENT AND A PROCESS FOR PRODUCING THE ROLLING ELEMENT

(75) Inventors: Eiji Hirai, Kanagawa (JP); Mitsuhiro Okuhata, Kanagawa (JP); Nobuo Kino, Kanagawa (JP); Keizo Otani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/964,562

(22) Filed: Sep. 28, 2001

(65) Prior Publication Data

US 2002/0068659 A1 Jun. 6, 2002

(30) Foreign Application Priority Data

Oct. 17, 2000 (JP) ........................................ 2000-316873
Jun. 21, 2001 (JP) ........................................ 2001-187697

(51) Int. Cl.$^7$ ............................................. F16H 15/38
(52) U.S. Cl. ........................... 476/40; 476/46; 384/492; 384/912
(58) Field of Search ............................. 476/40, 42, 46, 476/73; 384/446, 492, 907, 912, 913

(56) References Cited

U.S. PATENT DOCUMENTS

| | | | | |
|---|---|---|---|---|
| 4,955,246 A | * | 9/1990 | Nakano | ........................ 476/46 |
| 5,150,974 A | | 9/1992 | Tamada et al. | |
| 5,556,348 A | | 9/1996 | Kokubu et al. | |
| 5,670,265 A | * | 9/1997 | Grell et al. | ................. 428/612 |
| 6,051,080 A | | 4/2000 | Kino et al. | |
| 6,318,898 B1 | * | 11/2001 | Ward et al. | ................. 384/492 |

FOREIGN PATENT DOCUMENTS

| | | |
|---|---|---|
| JP | 6-313434 | 11/1994 |
| JP | 11-148542 | 6/1999 |
| JP | 2000-291757 | 10/2000 |

OTHER PUBLICATIONS

Linda M. Wing, "The Use of Electroless Nickel on Automotive Components," Trans Inst. Met. Finish; Transactions of the Institute of Metal Finishing; Jan. 1997, 75(1); pp. 11–14.
U.S. patent application Ser. No. 09/775,565, Yoshida et al., filed Aug. 23, 2001.
U.S. patent application Ser. No. 09/814,165, Ushijima et al., filed Dec. 13, 2001.
U.S. patent application Ser. No. 09/893,451, Oshidari et al., filed Jan. 3, 2002.
*Surface Roghness Definitions and Designation*, Japanese Industrial Standard, 1994, pp. 1–8, vol. B 0601, Japanese Standards Assocaition, Tokyo, Japan.
*Surface Texture– Instruments For The Assessment Of Surface Texture– Profiled Method*, Japanese Industrial Standard, 1996, pp., 1–19, vol. B 065, Japanese Standards Association, Tokyo, Japan.
*Vickers Hardness Test– Verification Of Testing Machines*, Japanese Industrial Standard, 1997 pp. 1–9, vol. B 7725, Japanese Standards Association, Tokyo, Japan.
*Vickers Hardness Test–Test Method*, Japanese Industrial Standard, 1998, pp. 1–8, vol. Z 2244, Japanese Standards Association, Tokyo, Japan.

* cited by examiner

Primary Examiner—William C. Joyce
(74) Attorney, Agent, or Firm—Foley & Lardner LLP

(57) ABSTRACT

A rolling element for a continuously variable transmission, including input and output disks and a power roller interposed between the input and output disks, the power roller including an inner race, an outer race and a plurality of rolling members interposed between the inner and outer races, the input and output disks and the inner race having rolling contact surfaces coming into rolling contact with each other via lubricating oil, the inner and outer races having rolling contact surfaces coming into rolling contact with the rolling members via lubricating oil, and a nickel-based coat formed on at least one of the rolling contact surfaces, the nickel-based coat having a thickness ranging from 0.1 to 20 μm.

27 Claims, 5 Drawing Sheets

TYPE B
SHORT LIFE

TYPE A
LONG LIFE

ROLLING ELEMENT FOR A CONTINUOUSLY VARIABLE TRANSMISSION (CVT), A CVT USING THE ROLLING ELEMENT AND A PROCESS FOR PRODUCING THE ROLLING ELEMENT

BACKGROUND OF THE INVENTION

The present invention relates to a rolling element for use in a rolling bearing or a toroidal continuously variable transmission (CVT) for automobiles and a process for producing the rolling element. More specifically, this invention relates to a rolling element for the CVT which is improved in rolling-fatigue strength by preventing short-life peeling or flaking due to hydrogen-induced embrittlement that will be caused when hydrogen generated by decomposition of a lubricating oil during rolling of the rolling element penetrates into the metal material of the rolling element, and a process for producing the rolling element.

U.S. Pat. No. 5,556,348 discloses a toroidal CVT which includes input and output disks and a power roller disposed between the input and output disks. The input and output disks and the power roller are subjected to carburizing and grinding to improve fatigue fracture lives of traction surfaces of the input and output disks and power roller.

U.S. Pat. No. 6,051,080 discloses a power roller for a toroidal CVT which is improved in durability by carburizing and in rolling-fatigue strength of the bearing surface receiving balls by grinding. In addition, Japanese Patent Application First Publication No. 2000-291757 discloses a power roller for a toroidal CVT in which residual compression stress layers are formed on the bearing surfaces receiving balls by shot-peening. This technique contemplates to reduce the contact surface pressure produced when the balls roll on the bearing surfaces, to thereby restrain deterioration of fatigue life of the power roller.

However, these earlier techniques do not disclose positive suppression of the above-described short-life flaking due to the hydrogen-induced embrittlement. U.S. Pat. No. 5,510,974 discloses a grease-sealed bearing aiming at suppressing hydrogen infiltration into races of the bearing. The races have triiron tetroxide layers on the bearing surfaces which are formed by blackening treatment to thereby restrain the occurrence of flaking on the bearing surfaces and improve lives of the bearing.

Japanese Patent Application First Publication No. 6-313434 discloses a corrosion resistant rolling bearing in which a nickel plating layer is formed on a surface of at least one of an inner race, an outer race, rolling members and a retainer for the rolling members. This technique contemplates to improve corrosion resistance under the severe corrosive environment such as salt water spraying and enhance the plating ability.

SUMMARY OF THE INVENTION

In general, the toroidal CVT includes an input disk, an output disk and power rollers contacted with the input and output disks via a lubricating oil. Each of the disks has a traction surface contacted with a traction surface of an inner race of each power roller. Rotation of the input disk is transmitted to the output disk by the traction drive produced between the traction surfaces of the disks and power rollers. When the toroidal CVT is driven, a high loading force is applied to the traction surfaces of the input and output disks and the traction surfaces of the power rollers. This will cause a high contact surface pressure exerted on bearing surfaces of the inner and outer races of each power roller which are in rolling contact with rolling members such as steel balls. At this time, the maximum contact surface pressure may reach more than 3 GPa. Further, traction force and radial load are applied onto the bearing surfaces of the races of the power roller when the rolling members roll on the bearing surfaces. This may cause microscopic metal-to-metal contact between the bearing surfaces and the rolling members or increase rolling-friction resistance generated therebetween, whereby tangential force applied onto the bearing surfaces will become large so that rolling-fatigue lives of the races will be lowered.

In addition, it is known that a grease-lubricating bearing tends to be affected by the tribochemical reaction caused between the grease and the bearing surfaces of the races which are in contact with a plurality of rolling members. The tribochemical reaction will be promoted by a catalytic action of the neo-surface that is newly produced on the bearing surface by the microscopic metal-to-metal contact between the bearing surfaces and the rolling members. This will cause chemical decomposition of the grease, resulting in the production of hydrogen. The hydrogen produced will infiltrate into the metal structure of the races to thereby deteriorate the rolling-fatigue lives thereof.

In order to eliminate the above-described problem of the grease-lubricating bearing, there has been proposed the blackening treatment as disclosed in the above-described earlier technique. In the blackening treatment, the races are immersed in a caustic soda solution heated at a temperature of 130° C.–160° C. This will make adverse influence on working environment and therefore it is industrially undesirable. Further, the triiron tetroxide layers formed by the blackening treatment will not sufficiently remain on the bearing surfaces under the severe conditions such as high temperature and high contact surface pressure. Therefore, it will not be assured to suppress the hydrogen infiltration into the metal structure of the races.

There is a demand to solve the above-described problems in the earlier techniques. An object of the present invention is to provide a rolling element for a continuously variable transmission (CVT) which is free from the neo-surface production caused by the microscopic metal-to-metal contact and therefore suppresses the hydrogen infiltration into the metal structure of the rolling element, by forming a protection coat capable of preventing hydrogen from infiltrating therethrough into the metal structure of the rolling element. Specifically, the object of the present invention is to provide the rolling element that can be prevented from suffering from the short-life flaking due to the hydrogen-induced embrittlement which is caused by infiltration of the hydrogen generated by chemical decomposition of a lubricating oil upon rolling of the rolling element, into the metal structure of the rolling element, so as to be improved in rolling-fatigue life. It is another object of the present invention to provide a process for producing the rolling element using a relatively simple surface treatment. Still other objects and features of this invention will become understood from the following description with reference to the accompanying drawings.

According to one aspect of the present invention, there is provided a rolling element for a continuously variable transmission, including input and output disks and a power roller interposed between the input and output disks, the power roller including an inner race, an outer race and a plurality of rolling members interposed between the inner and outer races, the input and output disks and the inner race having rolling contact surfaces coming into rolling contact with each other via lubricating oil, the inner and outer races having rolling contact surfaces coming into rolling contact with the rolling members via lubricating oil, the rolling element comprising:

a nickel-based coat formed on at least one of the rolling contact surfaces, the nickel-based coat having a thickness ranging from 0.1 to 20 μm.

The nickel-based coat of the rolling element according to the invention can be formed by a relatively simple surface treatment. With the formation of the nickel-based coat, the rolling element can be free from the microscopic metal-to-metal contact and be sufficiently prevented from suffering from hydrogen infiltration into the metal structure of the rolling element. The rolling element can be significantly improved in the rolling-fatigue life, and the excellent property of the coat can be maintained for a long period. If the thickness of the coat is less than 0.1 μm, the effects of reducing the microscopic metal-to-metal contact and suppressing the hydrogen infiltration into the metal structure of the rolling element will not be sufficiently exhibited. If the thickness of the coat is more than 20 μm, the stress generated in the coat will become excessively large as the thickness of the coat increases, so that flaking of the coat will occur in a relatively early stage of use. This cannot sufficiently contribute to improvement in the anti-flaking property of the coat, namely, the rolling-fatigue life of the rolling element.

The thickness of the nickel-based coat is preferably in a range of 0.1 to 10 μm. This can provide the stable quality of the rolling element which is required to perform the effects of reducing the microscopic metal-to-metal contact and suppressing the hydrogen infiltration into the metal structure of the rolling element. This can also improve productivity of the rolling element.

The thickness of the nickel-based coat is more preferably in a range of 0.5 to 7 μm. This can provide the more stable quality of the rolling element required for the effects described above and can more improve productivity of the rolling element.

The surface roughness of the nickel-based coat may be not more than 0.1 in terms of arithmetical mean roughness Ra. This can suppress increase in metal-to-metal contact rate at the rolling contact portion of the rolling element and deterioration of the rolling-fatigue life of the rolling element which results from surface damage caused from an outer-most area of the rolling contact portion. If the surface roughness Ra of the coat is more than 0.1, the metal-to-metal contact rate at the rolling contact portion of the rolling element will increase, thereby causing softening of the metal material due to the temperature increase at the rolling contact portion, and surface damage at the rolling contact portion. This will result in deterioration of the rolling-fatigue life of the rolling element. Meanwhile, the measurement of arithmetical mean roughness Ra of the coat is carried out in accordance with JIS B 0601-1994 and JIS B 0651.

A base metal of the rolling element which is obtained after forming the nickel-based coat thereon may have a surface roughness of not more than 0.1 in terms of arithmetical mean roughness Ra at the rolling contact surface. This can suppress increase in metal-to-metal contact rate at the rolling contact portion of the rolling element and deterioration of the rolling-fatigue life of the rolling element which is caused by the surface damage starting from an outer-most area of the rolling contact portion, even if the almost part of the coat is dissipated by wear and the base metal is brought into direct rolling contact. If the surface roughness Ra of the base metal at the rolling contact surface may be more than 0.1, the metal-to-metal contact rate at the rolling contact portion of the rolling element will increase, so that the rolling-fatigue life of the rolling element will be deteriorated as explained above. The measurement of arithmetical mean roughness Ra of the base metal is carried out in accordance with JIS B 0601-1994 and JIS B 0651.

The nickel-based coat may have a Vickers hardness of not less than Hv 300. This can assure sufficient wear resistance of the coat and maintain the excellent property of the coat. If the hardness of the coat is less than Hv 300, the wear resistance of the coat will become insufficient so that the excellent property of the coat cannot be obtained. The measurement of the hardness Hv is carried out in accordance with JIS B 7725 and JIS Z 2244.

The nickel-based coat may have a Vickers hardness ranging from Hv 300 to Hv 700. This can maintain the wear resistance of the coat and reduce the stress that might be caused in the coat, even when the coat has a relatively large thickness, so that the coat can be prevented from suffering from crack or flaking due to embrittlement. If the hardness of the coat is less than Hv 300, the wear resistance of the coat will become insufficient as described above. If the hardness of the coat is more than Hv 700, the stress that will be caused in the coat tends to increase specially when the thickness of the coat is as large as 10 to 20 μm. This will cause crack due to embrittlement of the coat under high contact surface pressure condition.

The nickel-based coat may contain phosphorus P in an amount of 0.1 to 12 mass percent. This can improve the wear resistance of the coat and assure the toughness thereof, so that the coat can be prevented from suffering from crack or flaking due to embrittlement and therefore the excellent property of the coat can be obtained. If the phosphorus P content is less than 0.1 mass percent, a sufficient wear resistance of the coat cannot be obtained. If the phosphorus P content is more than 12 mass percent, the toughness of the coat will decrease, thereby causing crack or flaking due to embrittlement of the coat.

According to a further aspect of the present invention, there is provided a continuously variable transmission, comprising:

input and output disks including a pair of first rolling contact surfaces opposed to each other, the input and output disks being arranged in a coaxial and spaced relation to each other;

a power roller interposed between the input and output disks, the power roller comprising:
a plurality of rolling members;
an inner race including a second rolling contact surface coming into rolling contact with the pair of first rolling contact surfaces via lubricating oil; and
an outer race opposed to the inner race,
the inner and outer races including a pair of third rolling contact surfaces coming into rolling contact with the plurality of rolling members via lubricating oil, and a nickel-based coat formed on at least one selected from the pair of first rolling contact surfaces, the second rolling contact surface and the pair of third rolling contact surfaces, the nickel-based coat having a thickness ranging from 0.1 to 20 μm.

The nickel-based coat may be formed on the bearing surfaces as the third rolling contact surfaces of the inner and outer races of the power roller. Since the nickel-based coat can withstand high contact surface pressure and high load applied to the bearing surfaces of the races, the races and the power roller can be improved in rolling-fatigue lives and the performance can be maintained for a long period of use. Further, the nickel-based coat may be formed on the traction surface as the second rolling contact surface of the inner race of the power roller and may be formed on the traction surfaces as the first rolling contact surfaces of the input and output disks. This can improve the rolling-fatigue lives of the power roller and the disks and the performance of the CVT as a whole can be increased.

According to a still further aspect of the present invention, there is provided a process for producing a rolling element for a continuously variable transmission, including input and output disks and a power roller interposed between the input and output disks, the power roller including an inner race, an outer race and a plurality of rolling members interposed between the inner and outer races, the input and output disks and the inner race having rolling contact surfaces coming into rolling contact with each other via lubricating oil, the inner and outer races having rolling contact surfaces coming into rolling contact with the rolling members via lubricating oil, the rolling element including a nickel-based coat formed on at least one of the rolling contact surfaces, the process comprising:

subjecting the at least one of the rolling contact surfaces to one of strike plating, electroplating, combination of strike plating and electroplating, and combination of strike plating and electroless plating to form the nickel-based coat thereon.

The process can provide a rolling element for a CVT which is prevented from suffering from microscopic metal-to-metal contact and hydrogen infiltration into the metal material of the rolling element to thereby be improved in the rolling-fatigue life, by using a relatively simple surface treatment. Namely, owing to forming the nickel-based coat on the rolling element, wear resistance of the coat and adhesion thereof relative to the metal material of the rolling element can be enhanced, so that the excellent property of the coat can be obtained.

The strike plating may be conducted at a current density of $0.1 \times 10^2$ to $10 \times 10^2$ A/m$^2$ (0.1 to 10 A/dm$^2$). This can increase the productivity and provide an adequate surface roughness of the coat to stabilize the quality of the rolling element. If the current density is less than $0.1 \times 10^2$ A/m$^2$ (0.1 A/dm$^2$), the productivity will be lowered to insufficient level. If the current density is more than $10 \times 10^2$ A/m$^2$ (10 A/dm$^2$), the productivity will be increased but the surface roughness of the coat will become large, making it difficult to assure the quality of the rolling element. Further, the strike plating is preferably conducted at a current density of $0.1 \times 10^2$ to $5 \times 10^2$ A/m$^2$ (0.1 to 5 A/dm$^2$). This can inhibit the decrease of the productivity to the full extent and provide an adequate surface roughness of the coat to stabilize the quality of the rolling element.

The electroplating may be conducted at a current density of $0.1 \times 10^2$ to $10 \times 10^2$ A/m$^2$ (0.1 to 10 A/dm$^2$). This can increase the productivity and provide an adequate surface roughness of the coat to stabilize the quality of the rolling element. If the current density is less than $0.1 \times 10^2$ A/m$^2$ (0.1 A/dm$^2$), the productivity will be lowered to insufficient level. If the current density is more than $10 \times 10^2$ A/m$^2$ (10 A/dm$^2$), the productivity will be increased but the surface roughness of the coat will become large, making it difficult to stabilize the quality of the rolling element.

The process may further include subjecting the at least one of the rolling contact surfaces to baking at a temperature of not more than 200° C. after the plating treatment. Owing to the baking at the temperature of not more than 200° C., softening of the metal material of the rolling element and reduction of the residual stress therein can be suppressed and sufficient effects of hydrogen removal can be provided. As a result, the more stabilized quality of the rolling element can be obtained. Namely, the hydrogen that is infiltrated into the coat or the metal material of the rolling element at the electroplating or electroless plating treatment and into the metal material thereof at the surface-hardening treatment such as carbonitriding, can be removed by the baking treatment. If the baking is conducted at a temperature of more than 200° C., the amount of the hydrogen removed will increase, but the metal material will be softened by heat at the high temperature, or the residual stress as required in a portion of the metal material to which residual compression stress is applied by shot-peening or other suitable method, will be reduced. The baking treatment is preferably carried out within a vacuum furnace. This can enhance the effects of hydrogen removal.

DETAILED DESCRIPTION OF THE INVENTION

Figure 1:
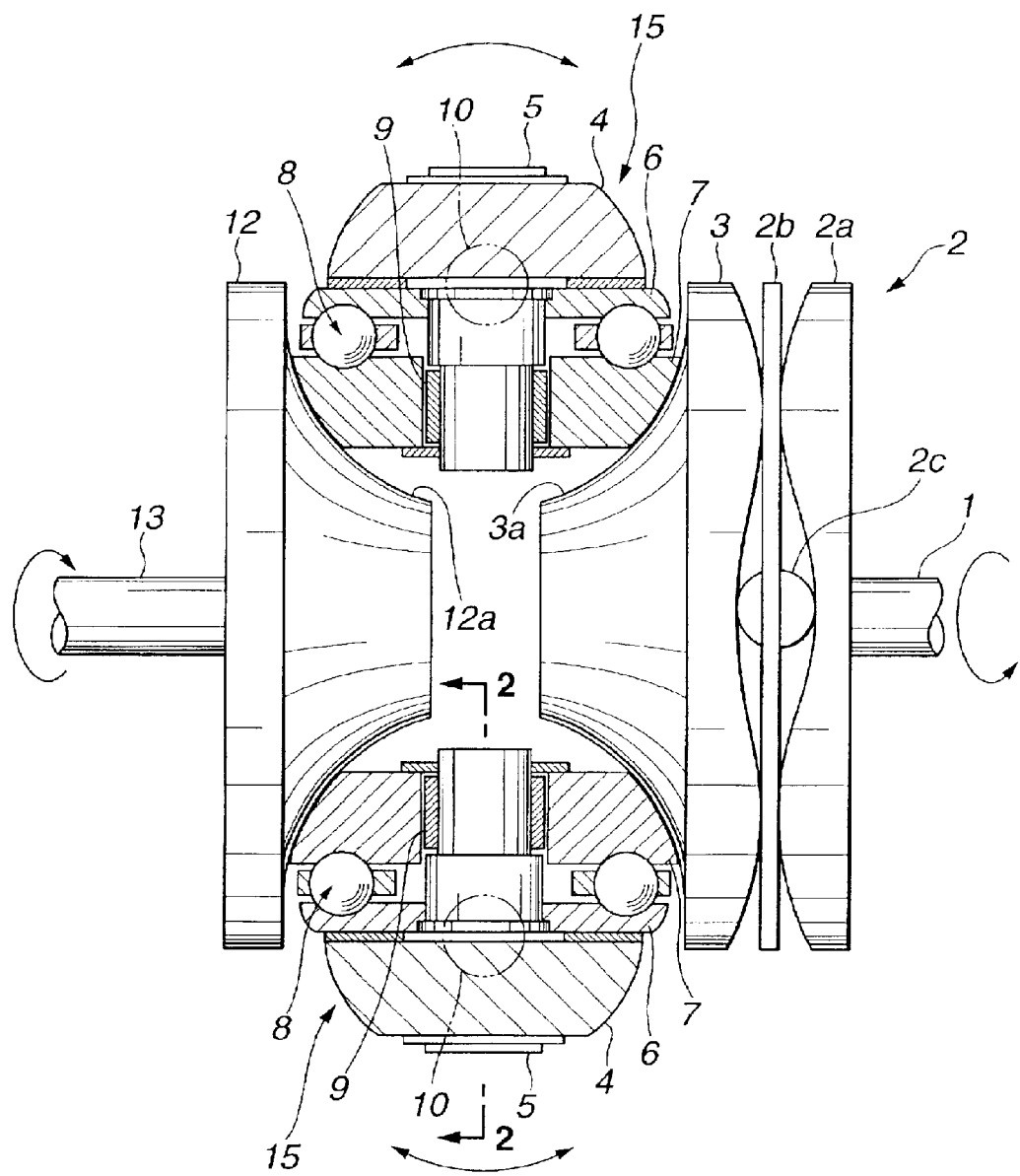
FIG. 1 is an explanatory diagram, partially in section, of a rolling element of a preferred embodiment, according to the present invention, which is incorporated to a toroidal continuously variable transmission (CVT), showing input and output disks and power rollers therebetween.
Figure 2:
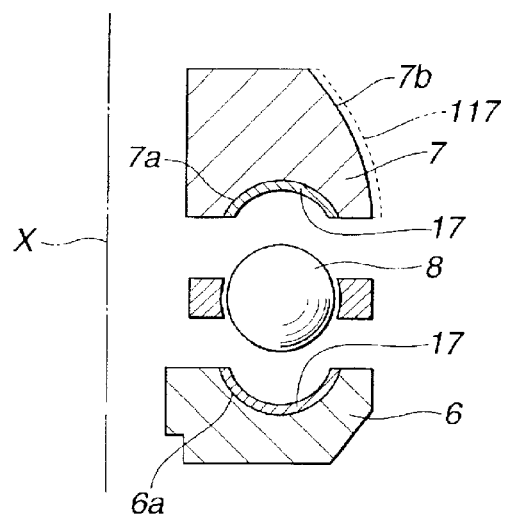
FIG. 2 is an enlarged exploded diagram of the power roller shown in FIG. 1, showing in section a right half of a pair of races relative to a rotation axis of the power roller, and coats formed on the races.

Referring now to FIGS. 1 and 2, a rolling element of a preferred embodiment, according to the present invention, which is incorporated to a toroidal continuously variable transmission (CVT), is explained.

As illustrated in FIG. 1, the toroidal CVT includes input disk 3 connected with input shaft 1 through loading cam device 2 that includes cam plate 2a, retainer 2b and cam roller 2c. Output disk 12 is fixed to output shaft 13 axially aligned with input shaft 1. Input disk 3 and output disk 12 having substantially the same shape are arranged in coaxial and symmetrical relation to each other as shown in FIG. 1. Input disk 3 and output disk 12 have axially opposed traction surfaces 3a and 12a forming a toroidal surface. A pair of power rollers 15, 15 are disposed in contact with traction surface 3a of input disk 3 and traction surface 12a of output disk 12.

Each power roller 15 includes a pair of trunnions 4, 4 and pivot shafts 5, 5 mounted to trunnions 4, 4, respectively. Outer race 6 is fixed to each of pivot shafts 5, 5. Inner race 7 is rotatably mounted to each pivot shaft 5 through radial needle bearing 9 and spaced from outer race 6 in an axial direction of pivot shaft 5. Inner race 7 is in contact with traction surfaces 3a and 12a of input and output disks 3 and 12 via a lubricating oil (traction oil). A plurality of rolling members 8, in the form of balls, are interposed between outer and inner races 6 and 7 in contact with races 6 and 7 via the lubricating oil.

When input shaft 1 of the thus-constructed CVT rotates, input disk 3 is rotated via loading cam device 2 including cam plate 2a, retainer 2b and roller 2c. This causes inner races 7, 7 of power rollers 15, 15 to rotate in contact with both of traction surface 3a of input disk 3 and traction surface 12a of output disk 12. Output disk 12 then is rotated together with output shaft 13. During the transmission of rotation from input shaft 1 to output shaft 13, trunnions 4, 4 with inner races 7, 7 of power rollers 15, 15 are rotated about pivot 10 indicated by phantom line in FIG. 1, so as to slantly move inner races 7, 7 relative to input and output disks 3 and 12. As a result, the contact between inner races 7, 7 and traction surfaces 3a and 12a of input and output disks 3 and 12 is displaced. Namely, the effective radiuses of input and output disks 3 and 12 vary, so that the speed ratio varies continuously to accelerate or decelerate the vehicle.

Upon the rotation transmission of the thus-constructed CVT, input and output disks 3 and 12 and each power roller 15 act as the rolling elements. At this time, traction surfaces 3a and 12a of input and output disks 3 and 12 and traction surface 7b shown in FIG. 2, of inner race 7 of power roller 15 come into rolling contact with each other, acting as rolling contact surfaces.

For simple illustration, FIG. 2 shows an exploded sectional view of only the right half of power roller 15 relative to rotation axis X of power roller 15. As illustrated in FIG. 2, outer and inner races 6 and 7 have bearing surfaces 6a and 7a, respectively, which define grooves receiving rolling members 8. Bearing surfaces 6a and 7a come into rolling contact with rolling members 8 and act as rolling contact surfaces upon rotation of power roller 15. Inner race 7 also has traction surface 7b on the outer circumferential periphery.

In this embodiment, nickel-based coats 17, 17 containing nickel Ni as a main component are formed on at least bearing surfaces 6a and 7a to which high contact surface pressure is applied upon the rolling contact with rolling members 8. Nickel-based coats 17, 17 have a thickness 0.1–20 μm. Nickel-based coats 17, 17 have a surface roughness expressed by arithmetical mean roughness Ra of not more than 0.1. The base metal covered with nickel-based coats 17, 17 has a surface roughness expressed by arithmetical mean roughness Ra of not more than 0.1. Nickel-based coats 17, 17 have a Vickers hardness of not less than Hv 300. Nickel-based coats 17, 17 contain phosphorus P in an amount of 0.1–12 mass percent.

With the formation of nickel-based coat 17, 17 on each of bearing surfaces 6a and 7a of outer and inner races 6 and 7 of power roller 15, the neo-surface production on bearing surfaces 6a and 7a, which will occur due to the microscopic metal-to-metal contact between bearing surfaces 6a and 7a and rolling members 8, can be reduced. Further, the hydrogen generated by the tribochemical reaction that is caused during rotation of power roller 15 by the catalytic action of the neo-surface, can be prevented from infiltrating into the metal structure of outer and inner races 6 and 7. As a result, the rolling-fatigue lives of outer and inner races 6 and 7 can be improved. Nickel-based coat 17 having the thickness of 0.1–20 μm can reduce the metal-to-metal contact and can suppress the hydrogen infiltration into the metal structure of outer and inner races 6 and 7. Nickel-based coat 17 having the above-specified thickness can also be inhibited from suffering from the occurrence of flaking at a relatively early stage of use of the CVT.

Further, since nickel-based coat 17 and the base metal covered therewith have the surface roughness Ra of not more than 0.1, increase in metal-to-metal contact rate at the rolling contact portions of bearing surfaces 6a and 7a can be suppressed, and the deterioration of the rolling-fatigue lives of outer and inner races 6 and 7 which starts from an outer-most region of the rolling contact portions of bearing surfaces 6a and 7a can be restrained. The deterioration of rolling-fatigue lives results from softening of the metal of outer and inner races 6 and 7 due to the temperature increase at the rolling contact portions of bearing surfaces 6a and 7a, and from surface damages at the rolling contact portions between bearing surfaces 6a and 7a and rolling members 8. In addition, nickel-based coat 17 having the hardness of not less than Hv 300 can exhibit sufficient wear resistance. Also, since nickel-based coat 17 contains the amount of phosphorus P in an amount of 0.1–12 mass percent, there can be provided sufficient wear resistance by $Ni_3P$ deposited and hardened, and the crack or flaking due to embrittlement that occurs as the toughness decreases can be suppressed. This can provide the CVT with excellent performance during a long period.

Figure 5:
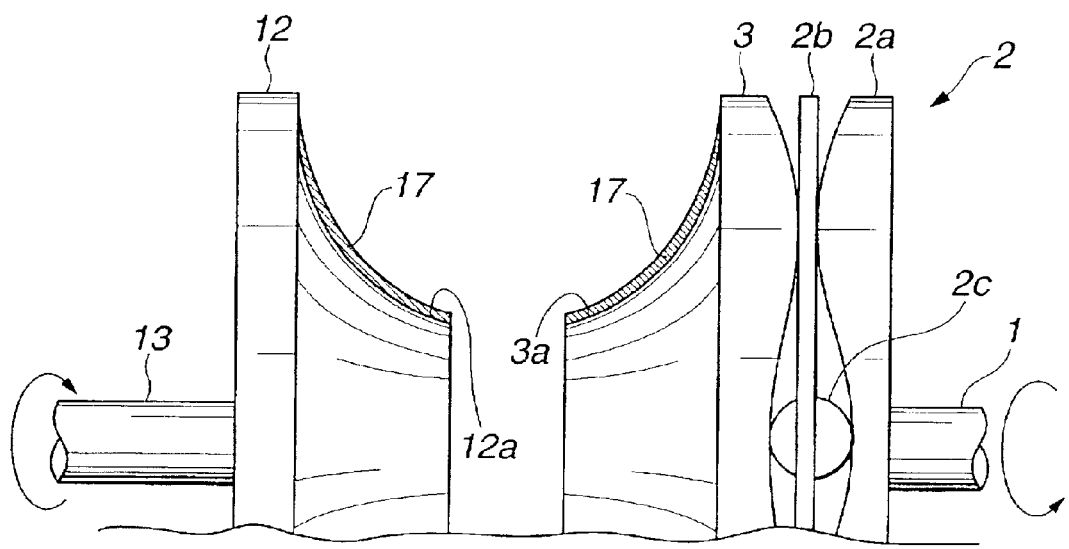
FIG. 5 is a modification of the embodiment.

Nickel-based coat 17 can also be formed on respective traction surfaces 3a and 12a of input and output disks 3 and 12 as shown in FIG. 5. Further, the nickel-based coat can be formed on traction surface 7b of inner race 7 of power roller 15 as indicated by phantom line 117 in FIG. 2.

A process for producing the rolling element for the toroidal CVT which has nickel-based coat 17 on the rolling contact surface as described above, according to the present invention, now is explained. First, a workpiece is subjected to forging and rough machining to form a preform. Next, the preform is subjected to surface-hardening such as carbonitriding. The preform surface-hardened is subjected to grinding and superfinishing to form the rolling contact surface. Subsequently, the rolling contact surface is subjected to one of strike plating, electroplating, combination of strike plating and electroplating and combination of strike plating and electroless plating to form nickel-based coat 17 thereon. It is preferable to conduct the strike plating at a current density of $0.1 \times 10^2$ to $10 \times 10^2$ A/m². More preferably, the current density is within the range of $0.1 \times 10^2$ to $5 \times 10^2$ A/m². It is also preferable to conduct the electroplating at a current density of $0.1 \times 10^2$ to $10 \times 10^2$ A/m². With application of the above-ranged current densities, the productivity of the rolling element can be assured and the adequate surface roughness of the nickel-based coat formed can be obtained to thereby make the quality of the rolling element stable. Further,-after the plating treatment, the rolling contact surface is preferably subjected to baking at a temperature of not more than 200° C.

EXAMPLES

The present invention is described in more detail by way of examples and comparative examples by referring to the accompanying drawings. However, these examples are only illustrative and not intended to limit a scope of the present invention thereto.

Examples 1–4, 7, 11, 17 and 18

Specimen of each of outer and inner races 6 and 7 shown in FIG. 2, of power roller 15 was prepared in the following manner.

A workpiece made of a steel having a chemical composition as shown in Table 1, was subjected to forging and rough machining to prepare a preform of each race 6 and 7.

TABLE 1

| Chemical Composition (mass %) | | | | | | |
| --- | --- | --- | --- | --- | --- | --- |
| C | Si | Mn | Cr | Mo | P | S |
| 0.2 | 0.25 | 0.8 | 1.1 | 0.15 | 0.015 | 0.009 |

Figure 3:
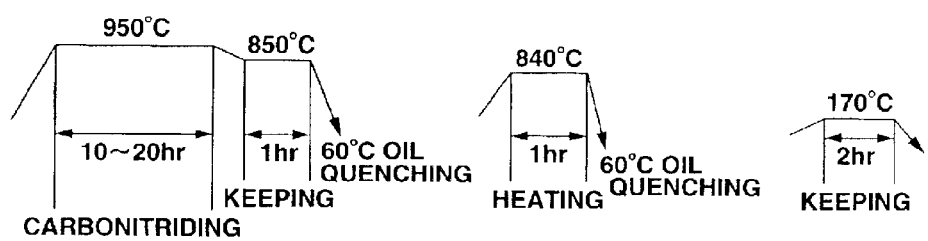
FIG. 3 is an explanatory diagram showing a surface-hardening process carried out in the embodiment of the present invention.

The preform was then subjected to surface-hardening as shown in FIG. 3. First, the preform was subjected to carbonitriding at 950° C. for 10–20 hours, kept at 850° C. for 1 hour and then subjected to oil-quenching in a 60° C. oil. Subsequently, the preform was heated at 840° C. for 1 hour and subjected to oil-quenching in a 60° C. oil. The preform was then kept at 170° C. for two hours. Next, the surface-hardened preform was subjected to grinding and superfinishing to form bearing surface 6a and 7a. Race 6 and 7 having bearing surface 6a and 7a thus was formed. The grinding and superfinishing were carried out such that the surface roughness, i.e., arithmetical mean roughness Ra, of a base metal of bearing surface 6a and 7a was substantially in a range of 0.02 to 0.10 μm and the surface hardness thereof was substantially in a range of a Vickers hardness of Hv 700 to Hv 720. Bearing surface 6a and 7a was subjected to strike plating and then electroplating to form nickel-based coat 17 shown in FIG. 2 thereon. The strike plating and the electroplating were conducted using strike plating bath A and electroplating bath B, respectively. The compositions and conditions of strike plating bath A and electroplating bath B were as follows. Strike plating bath A (Ni-based):

| nickel chloride | 200 g/L |
| --- | --- |
| hydrochloric acid | 80 g/L |
| boric acid | 30 g/L |
| pH | 1 or less |
| temperature | 50 to 55° C. |
| current density | $0.1 \times 10^2$ to $10 \times 10^2$ A/m$^2$ (0.1 to 10 A/dm$^2$) |
| Electroplating bath B (Ni-based): | |
| 60% nickel sulfamate | 800 g/L |
| nickel chloride | 15 g/L |
| hydrochloric acid | 45 g/L |
| saccharin soda | 5 g/L |
| pH | 4 to 5 |
| temperature | 55 to 60° C. |
| current density | $0.1 \times 10^2$ to $10 \times 10^2$ A/m$^2$ (0.1 to 10 A/dm$^2$) |

The strike plating and the electroplating were conducted at the current densities listed in Table 2.

Thus-formed nickel-based coat 17 and the underlying base metal were subjected to various measurements in the following manner to evaluate the properties.

The thickness of nickel-based coat 17 was measured by observing the section of nickel-based coat 17 with a scanning electron microscope SEM.

The surface roughness Ra of nickel-based coat 17 was measured using a tracer-type surface roughness tester at a cutoff of 0.08 mm. The tracer-type surface roughness tester was prescribed by JIS B 0651.

The surface roughness Ra of the base metal of bearing surface 6a and 7a covered with nickel-based coat 17 was measured in the following manner. Each race 6 and 7 was immersed in a stripping solution LIPMASTER #1219 (trademark of a cyanogen-based break away agent made by KIZAI Co.) after completion of testing of a rolling-fatigue life of each bearing surface 6a and 7a using a bearing rolling-fatigue tester shown in FIG. 4. Only nickel-based coat 17 over bearing surface 6a and 7a was completely chemically removed by the immersion so that the underlying base metal was exposed. Subsequently, the base metal at a non-rolling contact portion of bearing surface 6a and 7a was measured using the tracer-type surface roughness tester according to JIS B 0651, at a cutoff of 0.08 mm.

The hardness of nickel-based coat 17 was measured using a specific specimen of each race 6 and 7 which was formed with nickel-based coat 17 having the thickness of approximately 30 μm. This is because if the nickel-based coat has such a thin thickness as 10 μm, it is difficult to measure the thickness in the direction perpendicular go to the surface of the coat using a commercial micro-Vickers hardness tester. Accordingly, when nickel-based coat 17 having the thickness of approximately 30 μm was formed by electroplating or electroless plating described later in Examples 8–10, 13 and 19, the treatment time was increased so as to develop the thickness of nickel-based coat 17 to approximately 30 μm and other plating conditions were the same as described above.

Specifically, the measurement of the hardness of nickel-based coat 17 of the specific specimen was carried out in the following manner. The specific specimen was cut using a microcutter and embedded in a resin material. The cross-sectional surface of the specific specimen embedded was ground and then subjected to the hardness measurement in the cross-sectional direction using a commercial micro-Vickers hardness tester according to JIS B 7725 under a load of 0.49 N (0.05 kgf). The measurement method was substantially based on JIS Z 2244.

Subsequently, the amount of phosphorus P present in nickel-based coat 17 was measured using a fluorescent X-ray analysis apparatus. Namely, a plurality of samples whose phosphorus P contents were known but different from each other, were subjected to the fluorescent X-ray analysis. A calibration curve showing a relationship between the X-ray intensity and the content of phosphorus P was prepared on the basis of the analysis results. Next, each race 6 and 7 with nickel-based coat 17 was cut into test pieces having a suitable size. The test pieces were subjected to the fluorescent X-ray analysis under the same conditions as those for the samples to measure the X-ray intensity. The measured X-ray intensity was calculated in terms of the content of phosphorus P in each test piece on the basis of the calibration curve.

Figure 4:
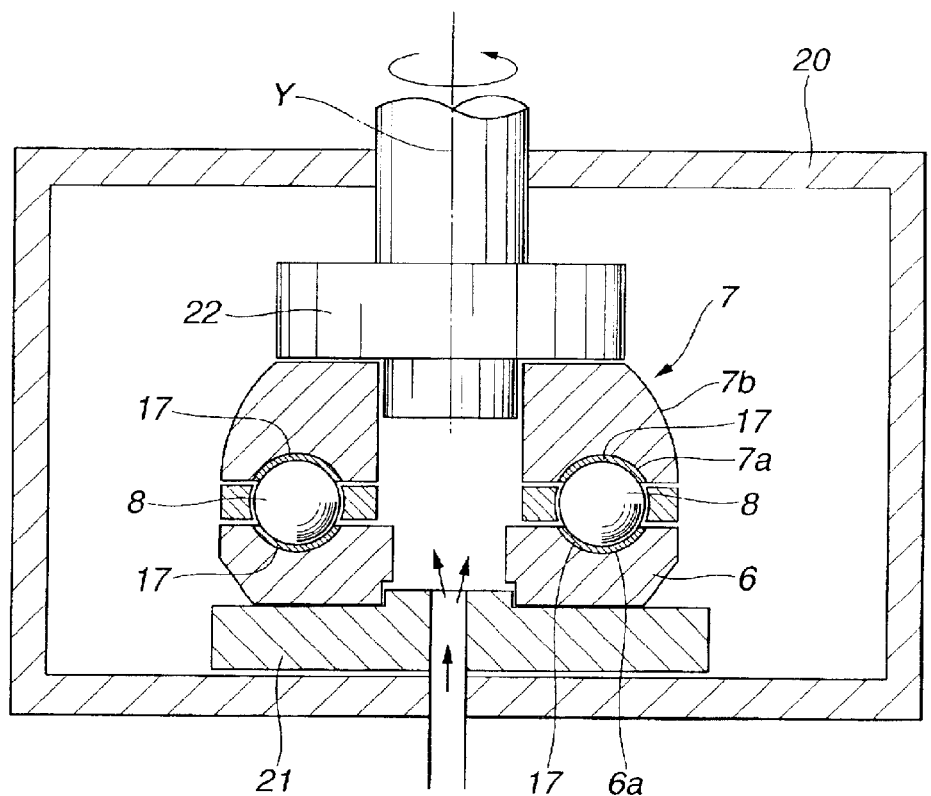
FIG. 4 is a schematic sectional view showing a bearing rolling-fatigue tester used for measuring rolling-fatigue strength of the rolling element of the embodiment.

Next, the specimens of races 6 and 7 having nickel-based coat 17 were subjected to a rolling-fatigue test using the bearing rolling-fatigue tester shown in FIG. 4, to thereby evaluate rolling-fatigue lives of bearing surfaces 6a and 7a. The bearing rolling-fatigue tester used included casing 20, base plate 21 disposed within casing 20, and rotation shaft 22 extending into casing 20. A lower surface of outer race 6 was supported by base plate 21. Rotating shaft 22 was brought into contact with an upper surface of inner race 7 by application of a predetermined force thereonto. A lubricating oil was supplied to the inside of inner race 7 via a through-hole of base plate 21 as indicated by arrows in FIG. 4. Inner race 7 was rotated with rotating shaft 22 while being supplied with the lubricating oil.

In the rolling-fatigue test, the predetermined force applied to rotating shaft 22 was set such that the maximum contact surface pressure exerted on bearing surfaces 6a and 7a was 3.4 GPa under forced lubrication using a traction oil as the lubricating oil, of 3 L/min. A vibration sensor was used in the measurement of rolling-fatigue lives of bearing surfaces 6a and 7a. The rolling-fatigue lives of bearing surfaces 6a and 7a were determined as the test time required for causing flaking on either one of bearing surfaces 6a and 7a.

The plating conditions and the results of the above-described measurements and test are shown in Table 2.

Examples 2–4, 7, 11, 17, 18

Inner and outer races 6 and 7 were prepared using the same steel and method as described in Example 1. Nickel-based coat 17 was formed on bearing surfaces 6a and 7a of races 6 and 7 in the same manner as described in Example 1, except that the current densities listed in Table 2 were used in the strike plating and the electroplating.

Thus-prepared races 6 and 7 with nickel-based coat 17 were measured and tested in the same manner as described in Example 1. The results of the measurements and test are shown in Table 2.

Example 5

Inner and outer races 6 and 7 were prepared using the same steel and method as described in Example 1. Nickel-based coat 17 was formed on bearing surfaces 6a and 7a of races 6 and 7 in the same manner as described in Example 1, except that 50% hypophosphorous acid of 0.6 g/L was added to electroplating bath B and the electroplating was conducted at the current density listed in Table 2.

Thus-prepared races 6 and 7 with nickel-based coat 17 were measured and tested in the same manner as described in Example 1. The results of the measurements and test are shown in Table 2.

Example 6

Inner and outer races 6 and 7 were prepared using the same steel and method as described in Example 1. Nickel-based coat 17 was formed on bearing surfaces 6a and 7a of races 6 and 7 in the same manner as described in Example 1, except that 50% hypophosphorous acid of 1 g/L was added to electroplating bath B and the electroplating was conducted at the current density listed in Table 2.

Thus-prepared races 6 and 7 with nickel-based coat 17 were measured and tested in the same manner as described in Example 1. The results of the measurements and test are shown in Table 2.

Examples 8–9

Inner and outer races 6 and 7 were prepared using the same steel and method as described in Example 1. Nickel-based coat 17 was formed on bearing surfaces 6a and 7a of races 6 and 7 in the same manner as described in Example 1, except that electroless plating was conducted instead of the electroplating. The electroless plating was carried out using the following electroless plating bath C.

Electroless Plating Bath C

| | |
|---|---|
| nickel chloride | 16 g/L |
| sodium hypophosphite | 24 g/L |
| sodium succinate | 16 g/L |
| malic acid | 18 g/L |
| diethylamine | 10 g/L |
| pH | 5 to 6 |
| temperature | 90 to 95° C. |

Thus-prepared races 6 and 7 with nickel-based coat 17 were measured and tested in the same manner as described in Example 1. The results of the measurements and test are shown in Table 2.

Example 10

Inner and outer races 6 and 7 were prepared using the same steel and method as described in Example 1. Nickel-based coat 17 was formed on bearing surfaces 6a and 7a of races 6 and 7 in the same manner as described in Examples 8–9, except that the amount of sodium hypophosphite added to electroless plating bath C was 35 g/L.

Thus-prepared races 6 and 7 with nickel-based coat 17 were measured and tested in the same manner as described in Example 1. The results of the measurements and test are shown in Table 2.

Example 12

Inner and outer races 6 and 7 were prepared using the same steel and method as described in Example 1. Nickel-based coat 17 was formed on bearing surfaces 6a and 7a of races 6 and 7 in the same manner as described in Example 1, except that only the electroplating was conducted at the current density listed in Table 2 without conducting the strike plating.

Thus-prepared races 6 and 7 with nickel-based coat 17 were measured and tested in the same manner as described in Example 1. The results of the measurements and test are shown in Table 2.

Example 13

Inner and outer races 6 and 7 were prepared using the same steel and method as described in Example 1. Nickel-based coat 17 was formed on bearing surfaces 6a and 7a of races 6 and 7 in the same manner as described in Examples 8–9, except that the amount of sodium hypophosphite added to electroless plating bath C was 46 g/L.

Thus-prepared races 6 and 7 with nickel-based coat 17 were measured and tested in the same manner as described in Example 1. The results of the measurements and test are shown in Table 2.

Example 14

Inner and outer races 6 and 7 were prepared using the same steel and method as described in Example 1. Nickel-based coat 17 was formed on bearing surfaces 6a and 7a of races 6 and 7 in the same manner as described in Example 1, except that the current density applied in the plating process was $7 \times 10^2$ A/m$^2$. The surface roughness Ra of nickel-based coat 17 was 0.12 µm.

Thus-prepared races 6 and 7 with nickel-based coat 17 were measured and tested in the same manner as described in Example 1. The results of the measurements and test are shown in Table 2.

Example 15

Inner and outer races 6 and 7 were prepared using the same steel and method as described in Example 1. Nickel-based coat 17 was formed on bearing surfaces 6a and 7a of races 6 and 7 in the same manner as described in Example 1, except that the current density applied in the electroplating was $15 \times 10^2$ A/m$^2$. The surface roughness Ra of nickel-based coat 17 was 0.12 µm.

Thus-prepared races 6 and 7 with nickel-based coat 17 were measured and tested in the same manner as described in Example 1. The results of the measurements and test are shown in Table 2.

Example 16

Inner and outer races 6 and 7 were prepared using the same steel and method as described in Example 1. Nickel-based coat 17 was formed on bearing surfaces 6a and 7a of races 6 and 7 in substantially the same manner as described in Example 1. Baking was conducted within a vacuum furnace at 130° C. for 20 hours after the strike plating and the electroplating.

Thus-prepared races 6 and 7 with nickel-based coat 17 were measured and tested in the same manner as described in Example 1. The results of the measurements and test are shown in Table 2.

Example 19

Inner and outer races 6 and 7 were prepared using the same steel and method as described in Example 1. Nickel-based coat 17 was formed on bearing surfaces 6a and 7a of races 6 and 7 in the same manner as described in Examples 8–9, except that baking was conducted within a vacuum furnace at 130° C. for 20 hours after the strike plating and the electroless plating.

Thus-prepared races 6 and 7 with nickel-based coat 17 were measured and tested in the same manner as described in Example 1. The results of the measurements and test are shown in Table 2.

Examples 20–22

Inner and outer races 6 and 7 were prepared using the same steel and method as described in Example 1. Nickel-based coat 17 was formed on bearing surfaces 6a and 7a of races 6 and 7 in the same manner as described in Example 1, except that only the strike plating was conducted at the current densities listed in Table 2 without conducting the electroplating.

Thus-prepared races 6 and 7 with nickel-based coat 17 were measured and tested in the same manner as described in Example 1. The results of the measurements and test are shown in Table 2.

Comparative Examples 1–2

Inner and outer races 6 and 7 were prepared using the same steel and method as described in Example 1. Bearing surfaces 6a and 7a of thus-prepared races 6 and 7 were not subjected to the plating treatment to thereby form no nickel-based coat thereon. Bearing surfaces 6a and 7a of Comparative Example 1 had the surface roughness different from the surface roughness of those of Comparative Example 2 as shown in Table 2.

Thus-prepared races 6 and 7 were tested in the same manner as described in Example 1. The results of the test are shown in Table 2.

Comparative Example 3

Inner and outer races 6 and 7 were prepared using the same steel and method as described in Example 1. Nickel-based coat 17 was formed on bearing surfaces 6a and 7a of races 6 and 7 in the manner different from Example 1 in that the electroplating was conducted for a relatively long period at the current density of $7 \times 10^2$ A/m² so that the thickness of nickel-based coat 17 was 24 μm larger than the thickness thereof in Examples 1–22.

Thus-prepared races 6 and 7 with nickel-based coat 17 were measured and tested in the same manner as described in Example 1. The results of the measurements and test are shown in Table 2.

Comparative Example 4

Inner and outer races 6 and 7 were prepared using the same steel and method as described in Example 1. Bearing surfaces 6a and 7a of races 6 and 7 were subjected to a blackening-treatment in which they were immersed in a caustic soda solution, to thereby form an iron oxide coat thereon.

Thus-prepared races 6 and 7 with the iron oxide coat were measured and tested in the same manner as described in Example 1. The results of the measurements and test are shown in Table 2.

Figure 6B:
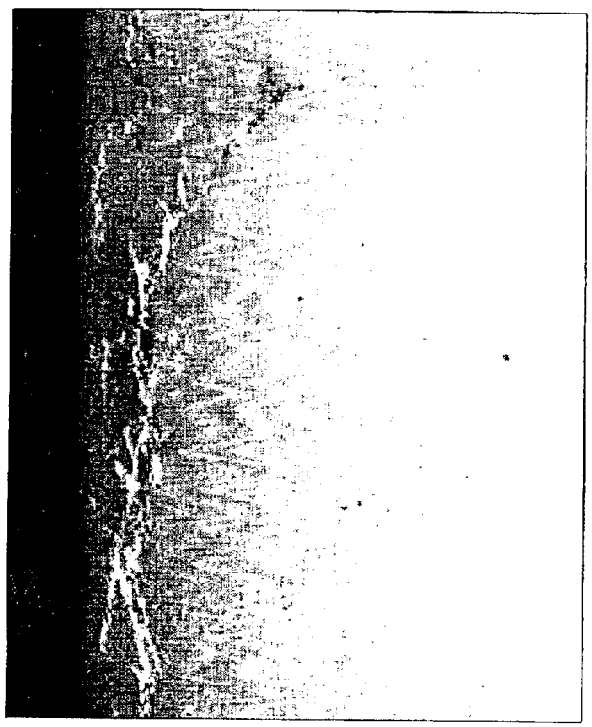
FIGS. 6A and 6B are photographs showing different types of microstructural change observed near flaking portions of the races of the power roller in examples and comparative examples, respectively.
Figure 6A:

After the rolling-fatigue test, the specimens of Examples 1–22 and Comparative Examples 1–4 were subjected to observation of the microstructure of the near-flaking portion of bearing surfaces 6a and 7a which was located in the vicinity of the flaking occurred in the rolling-fatigue test. The section of the near-flaking portion taken in the rolling direction was observed. The near-flaking portion had either of the different microstructural changes of types A and B shown in photographs of FIGS. 6A and 6B. There are white portions shown in FIGS. 6A and 6B, which are different in structure from gray portions adjacent to the white portions. The microstructural change of type A was observed in the specimens whose lives were relatively long in the rolling-fatigue test, while the microstructural change of type B was observed in the specimens whose lives were relatively short in the rolling-fatigue test.

The results of the observation are shown in Table 2.

TABLE 2

| | | Coat Property | | | Base Metal | | Production Process | | | |
|---|---|---|---|---|---|---|---|---|---|---|
| | | | | | | | Strike-Plating | Electro-plating | | |
| | Thickness (μm) | Surface Roughness Ra (μm) | Hardness (Hv) | Phosphorus Content (mass %) | Surface Roughness After Coat Formation Ra (μm) | Production Process Plating Process | Current Density ($\times 10^2$ A/m²) | Current Density ($\times 10^2$ A/m²) | Test Result Flaking Life (hr) | Type of Microstructural Change |
| Example 1 | 1.5 | 0.03 | 420 | 0 | 0.02 | Strike plating + Electroplating | 2 | 0.5 | 137 | A |
| 2 | 5 | 0.03 | 430 | 0 | 0.03 | Strike plating + Electroplating | 2 | 2 | 140 | A |
| 3 | 4 | 0.09 | 425 | 0 | 0.04 | Strike plating + Electroplating | 2 | 9 | 78 | A |
| 4 | 15 | 0.05 | 410 | 0 | 0.02 | Strike plating + Electroplating | 4 | 7 | 132 | A |

TABLE 2-continued

| | | Coat Property | | | Base Metal | | Production Process | | | |
|---|---|---|---|---|---|---|---|---|---|---|
| | Thickness (μm) | Surface Roughness Ra (μm) | Hardness (Hv) | Phosphorus Content (mass %) | Surface Roughness After Coat Formation Ra (μm) | Production Process Plating Process | Strike-Plating Current Density (× 10² A/m²) | Electroplating Current Density (× 10² A/m²) | Test Result Flaking Life (hr) | Type of Microstructural Change |
| 5 | 5 | 0.04 | 600 | 0.5 | 0.03 | Strike plating + Electroplating | 2 | 4 | 135 | A |
| 6 | 3 | 0.04 | 630 | 1.2 | 0.03 | Strike plating + Electroplating | 2 | 4 | 145 | A |
| 7 | 0.7 | 0.04 | 435 | 0 | 0.04 | Strike plating + Electroplating | 0.5 | 1.5 | 112 | A |
| 8 | 3 | 0.04 | 545 | 6.9 | 0.02 | Strike plating + Electroless plating | 2 | — | 114 | A |
| 9 | 4 | 0.07 | 595 | 8.4 | 0.04 | Strike plating + Electroless plating | 2 | — | 136 | A |
| 10 | 6 | 0.08 | 685 | 10.8 | 0.03 | Strike plating + Electroless plating | 2 | — | 103 | A |
| 11 | 4 | 0.11 | 420 | 0 | 0.06 | Strike plating + Electroplating | 2 | 4 | 65 | A |
| 12 | 4 | 0.04 | 390 | 0 | 0.03 | Electroplating | — | 4 | 74 | A |
| 13 | 3 | 0.04 | 745 | 14.1 | 0.03 | Strike plating + Electroless plating | 2 | — | 63 | A |
| 14 | 5 | 0.12 | 410 | 0 | 0.11 | Strike plating + Electroplating | 7 | 7 | 72 | A |
| 15 | 12 | 0.12 | 420 | 0 | 0.04 | Strike plating + Electroplating | 2 | 15 | 59 | A |
| 16 | 5 | 0.03 | 310 | 0 | 0.02 | Strike plating + Electroplating + Baking | 2 | 2 | 152 | A |
| 17 | 9 | 0.05 | 410 | 0 | 0.03 | Strike plating + Electroplating | 4 | 7 | 128 | A |
| 18 | 0.3 | 0.04 | 430 | 0 | 0.04 | Strike plating + Electroplating | 0.5 | 1.5 | 89 | A |
| 19 | 3 | 0.04 | 625 | 6.9 | 0.03 | Strike plating + Electroless plating + Baking | 2 | — | 144 | A |
| 20 | 2 | 0.03 | 360 | 0 | 0.03 | Strike plating | 3 | — | 125 | A |
| 21 | 8 | 0.06 | 380 | 0 | 0.03 | Strike plating | 4 | — | 108 | A |
| 22 | 12 | 0.14 | 385 | 0 | 0.04 | Strike plating | 8 | — | 55 | A |
| Comparative 1 | None | — | — | — | *0.04 | None | — | — | 36 | B |
| Comparative 2 | None | — | — | — | *0.12 | None | — | — | 21 | B |
| Comparative 3 | 24 | 0.12 | 330 | 0 | 0.06 | Strike plating + Electroplating | 4 | 7 | 42 | A (coat flaking) |
| Comparative 4 | — | 0.06 | — | — | — | Iron oxide coating | — | — | 40 | B |

Note: *Coat was not formed.

As seen from Table 2, the specimens of Examples 1–22 exhibited the rolling-fatigue lives longer than the rolling-fatigue lives of the specimens of Comparative Examples 1–4. It has been found that the rolling-fatigue lives of the specimens of Examples 1–22 can be significantly improved as compared with those of the specimens of Comparative Examples 1–4, by suitably setting the thickness, surface roughness and hardness of nickel-based coat 17, the phosphorus content in nickel-based coat 17 and the current density applied in the plating process, and by conducting the baking treatment. Further, it has been found that the specimens of Examples 1–22 exhibited the microstructural change of type A serving for the long lives, and that the specimens of Comparative Examples 1, 2 and 4 exhibited the microstructural change of type B explicitly inferior in the lives to the microstructural change of type A.

After the rolling-fatigue test and the microstructure observation, samples were cut out from bearing surface 6a and 7a of the specimens and then subjected to determination of the amount of diffusible hydrogen present in the steel. The determination was conducted using Diffusible Hydrogen Analyzer UPM-ST-200R manufactured by ULVAC Co. The samples were heated at a temperature of not less than 400° C., and the amount of hydrogen removed therefrom was measured. The measured amount of hydrogen removed was calculated as the amount of diffusible hydrogen. Also, other samples were cut out from specimens that were not subjected to the rolling-fatigue test, and then subjected to the determination of the amount of diffusible hydrogen in the same manner.

Table 3 shows the results of the determination of the amount of diffusible hydrogen.

TABLE 3

| Specimens | | Diffusible hydrogen (ppm) | Life |
|---|---|---|---|
| Rolling-fatigue test conducted | Microstructural change Type A | 1.2 | Long |
| | Microstructural change Type B | 4.1 | Short |
| Rolling-fatigue test non-conducted | | 0.8 | — |

It will be understood from Table 3 that the amount of the hydrogen infiltrating into the specimens having the microstructural change of type B is larger than the amount thereof infiltrating into the specimens having the microstructural change of type A. The specimens having the microstructural change of type B suffer from flaking caused by the hydrogen embrittlement due to the larger hydrogen infiltration. Accordingly, the microstructural change of type A can be made by suppressing the hydrogen infiltration.

This application is based on prior Japanese Patent Applications Nos. 2000-316873 filed on Oct. 17, 2000, and 2001-187697 filed on Jun. 21, 2000, the entire contents of which are hereby incorporated by reference.

Although the invention has been described above by reference to a certain embodiment and examples of the invention, the invention is not limited to the embodiment and examples described above. Modifications and variations of the embodiment and examples described above will occur to those skilled in the art in light of the above teachings. The scope of the invention is defined with reference to the following claims.

What is claimed is:

1. A rolling element for a continuously variable transmission, including input and output disks and a power roller interposed between the input and output disks, the power roller including an inner race, an outer race and a plurality of rolling members interposed between the inner and outer races, the input and output disks and the inner race having rolling contact surfaces coming into rolling contact with each other via lubricating oil, the inner and outer races having rolling contact surfaces coming into rolling contact with the rolling members via lubricating oil, the rolling element comprising:

a nickel-based coat formed on at least one of the rolling contact surface, the nickel-based coat having a thickness ranging from 0.1 to 20 μm, wherein the nickel-based coat has a surface roughness of not more than 0.1 in terms of arithmetical mean roughness Ra.

2. The rolling element as claimed in claim 1, wherein the thickness of the nickel-based coat is in a range of 0.1 to 10 μm.

3. The rolling element as claimed in claim 1, wherein the thickness of the nickel-based coat is in a range of 0.5 to 7 μm.

4. The rolling element as claimed in claim 1, wherein the nickel-based coat has a Vickers hardness of not less than Hv 300.

5. The rolling element as claimed in claim 1, wherein the nickel-based coat has a Vickers hardness ranging from Hv 300 to Hv 700.

6. The rolling element as claimed in claim 1, wherein the nickel-based coat contains phosphorus P in an amount of 0.1 to 12 mass percent.

7. The rolling element as claimed in claim 1, wherein the rolling contact surfaces of the inner and outer races comprise a bearing surface of each of the inner and outer races which is in contact with the rolling members, the nickel-based coat being formed on the bearing surface of each of the inner and outer races.

8. The rolling element as claimed in claim 1, wherein the rolling contact surfaces between the input and output disks and the inner race comprises a traction surface of the inner race which is in contact with the input and output disks, the nickel-based coat being formed on the fraction surface of the inner race.

9. The rolling element as claimed in claim 1, wherein the rolling contact surfaces between the input and output disks and the inner race comprises a traction surface of each of the input and output disks which is in contact with the inner race of the power roller, the nickel-based coat being formed on the traction surface.

10. A rolling element for a continuously variable transmission, including input and output disks and a power roller interposed between the input and output disks, the power roller including an inner race, an outer race and a plurality of rolling members interposed between the inner and outer races, the input and output disks and the inner race having rolling contact surfaces coming into rolling contact with each other via lubricating oil, the inner and outer races having rolling contact surfaces coming into rolling contact with the rolling members via lubricating oil, the rolling element comprising:

a nickel-based coat formed on at least one of the rolling contact surface, the nickel-based coat having a thickness ranging from 0.1 to 20 μm, wherein a base metal of the rolling element which is obtained after forming the nickel-based coat thereon has a surface roughness of not more than 0.1 in terms of arithmetical mean roughness Ra at the rolling contact surface.

11. A continuously variable transmission, comprising:

input and output disks including a pair of first rolling contact surfaces opposed to each other, the input and output disks being arranged in a coaxial and spaced relation to each other;

a power roller interposed between the input and output disks, the power roller comprising:

a plurality of rolling members;

an inner race including a second rolling contact surface coming into rolling contact with the pair of first rolling contact surfaces via lubricating oil; and an outer race opposed to the inner race, the inner and outer races including a pair of third rolling contact surfaces coming into rolling contact with the plurality of rolling members via lubricatin oil, and a nickel-based coat formed on at least one selected from the pair of first rolling contact surfaces, the second rolling contact surface and the pair of third rolling contact surfaces, the nickel-based coat having a thickness ranging from 0.1 to 20 μm, wherein the nickel-based coat has a surface roughness of not more than 0.1 in terms of arithmetical mean roughness Ra.

12. The continuously variable transmission claimed in claim 11, wherein the thickness of the nickel-based coat is in a range of 0.1 to 10 μm.

13. The continuously variable transmission claimed in claim 11, wherein the thickness of the nickel-based coat is in a range of 0.5 to 7 μm.

14. The continuously variable transmission as claimed in claim 11, wherein the nickel-based coat has a Vickers hardness of not less than Hv 300.

15. The continuously variable transmission as claimed in claim 11, wherein the nickel-based coat has a Vickers hardness ranging from Hv 300 to Hv 700.

16. The continuously variable transmission as claimed in claim 11, wherein the nickel-based coat contains phosphorus in an amount of 0.1 to 12 mass percent.

17. The continuously variable transmission as claimed in claim 11, wherein the nickel-based coat is formed on the pair of third rolling contact surfaces of the inner and outer races of the power roller.

18. The continuously variable transmission as claimed in claim 11, wherein the nickel-based coat is formed on the second rolling contact surface of the inner race of the power roller.

19. The continuously variable transmission as claimed in claim 11, wherein the nickel-based coat is formed on the pair of first rolling contact surfaces of the input and output disks.

20. A continuously variable transmission, comprising:

input and output disks including a pair of first rolling contact surfaces oposed to each other, the input and output disks being arranged in a coaxial and spaced relation to each other;

a power roller interposed between the input and output disks, the power roller comprising:

a plurality of rolling members;

an inner race including a second rolling contact surface coming into rolling contact with the pair of first rolling contact surfaces via lubricating oil; and an outer race opposed to the inner race, the inner and outer races including a pair of third rolling contact surfaces coming into rolling contact with the plurality of rolling members via lubricatin oil, and a nickel-based coat formed on at least one selected from the pair of first rolling contact surfaces, the second rolling contact surface and the pair of third rolling contact surfaces, the nickel-based coat having a thickness ranging from 0.1 to 20 µm, wherein a base metal of the rolling element which is obtained after forming the nickel-based coat thereon has a surface roughness of not more than 0.1 in terms of arithmetical mean roughness Ra at the rolling contact surface.

21. A process for producing a rolling element for a continuously variable transmission, including input and output disks and power roller interposed between the input and output disks, the power roller including an inner race, an outer race and a plurality of rolling members interposed between the inner and outer races, the input and output disks and the inner race having rolling contact surfaces coming into rolling contact with each other via lubricating oil, the inner and outer races having rolling contact surfaces coming into rolling contact with the rolling members via lubricating oil, the rolling element including a nickel-based coat formed on at least one of the rolling contact surfaces, the process comprising:

subjecting the at least one of the rolling contact surfaces to one of strike plating, electroplating, combination of strike plating and electroplating, and combination of strike plating and electroless plating to form the nickel-based coat thereon, wherein the nickel-based coat is formed to have a thickness ranging from 0.1 to 20 µm, and wherein the nickel-based coat is formed to have a surface roughness of not more than 0.1 in terms of arithmetical mean roughness Ra.

22. The process as claimed in claim 21, wherein the strike plating is conducted at a current density of $0.1 \times 10^2$ to $10 \times 10^2$ A/m$^2$.

23. The process as claimed in claim 22, wherein the strike plating is conducted at a current density of $0.1 \times 10^2$ to $5 \times 10^2$ A/m$^2$.

24. The process as claimed in claim 21, wherein the electroplating is conducted at a current density of $0.1 \times 10^2$ to $1 \times 10^2$ A/m$^2$.

25. The process as claimed in claim 21, further comprising subjecting the at least one of the rolling contact surfaces to baking at a temperature of not more than 200° C. after the one of strike plating, electroplating, combination of strike plating and electroplating, and combination of strike plating and electroless plating.

26. The process as claimed in claim 21, further comprising subjecting a workpiece to forging and rough machining to form a preform, subjecting the preform to surface-hardening, subjecting the surface-hardened preform to grinding and superfinishing to form the rolling contact surface.

27. The process as claimed in claim 26, wherein the surface-hardening comprises carbonitriding.

* * * * *